(12) United States Patent
Tanabe et al.

(10) Patent No.: US 6,247,006 B1
(45) Date of Patent: Jun. 12, 2001

(54) AUTOMATIC PROGRAMMING METHOD FOR PUNCH PRESS AND APPARATUS FOR THE SAME

(75) Inventors: Kazuo Tanabe; Mutsuyoshi Kurasawa, both of Kanagawa (JP)

(73) Assignee: Amada Metrecs Co., Ltd., Kanagawa (JP)

(*) Notice: Subject to any disclaimer, the term of this patent is extended or adjusted under 35 U.S.C. 154(b) by 0 days.

(21) Appl. No.: 09/073,957

(22) Filed: May 7, 1998

(30) Foreign Application Priority Data

Jun. 24, 1997 (JP) .................................................. 9-167618

(51) Int. Cl.$^7$ ................................................. G06F 17/00
(52) U.S. Cl. .............................. 706/47; 382/151; 382/209
(58) Field of Search .............................. 706/47; 382/151, 382/209

(56) References Cited

U.S. PATENT DOCUMENTS

| | | | |
|---|---|---|---|
| 5,293,106 | * 3/1994 | Miyamoto | 318/568.1 |
| 5,581,664 | * 12/1996 | Allen et al. | 706/47 |
| 5,754,677 | * 5/1998 | Kawada | 382/141 |
| 5,901,246 | * 5/1999 | Hoffberg et al. | 382/209 |
| 5,920,480 | * 1/1999 | Nakamura et al. | 700/114 |
| 5,982,945 | * 11/1999 | Neff et al. | 382/271 |
| 6,009,212 | * 12/1999 | Miller et al. | 382/294 |
| 6,067,379 | * 5/2000 | Silver | 382/216 |

OTHER PUBLICATIONS

Tao et al, "Machine Vision in the Inspection on Patterned Textile Webs", IEEE Colloguium on Industrial Inspection, Feb. 1997.*

Amit et al, "Graphical Templates for Model Registration", IEEE Transactions on Pattern Analysis and Machine Intelligence, Mar. 1996.*

Meijer, B. R. "Rules and algorithms for the Design of Templates for Template Matching", IEEE Proceedings of the 11th IAPR International Conference on pattern Recognition, Aug.–Sep. 1992.*

* cited by examiner

Primary Examiner—George B. Davis
(74) Attorney, Agent, or Firm—Greenblum & Bernstein P.L.C.

(57) ABSTRACT

According to an aspect of the disclosed invention, characteristic portions of graphic images to be used for machining in the form of profiles of a plurality of templates are first registered in advance along with machining design data corresponding to the respective profiles of the templates and including machining methods adapted to the respective profiles of the templates in the form of template machinings. Then, a specific characteristic portion is extracted out of the graph image given for a machining operation and the extracted characteristic portion is collated with each of the registered template profiles. Thereafter, the template machinings for the template profile recognized to be corresponding to the extracted characteristic portion as a result of the collation are read out from the registered data. Finally, the related machining design data is assigned to the extracted characteristic portion according to the read out template machinings to automatically prepare a machining program for a punch press.

7 Claims, 17 Drawing Sheets

FIG. 5
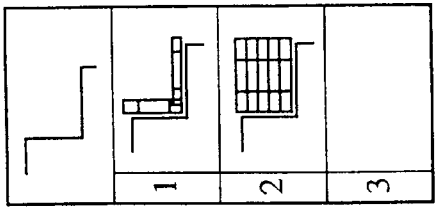
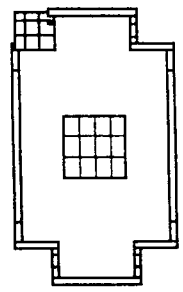
THE ASSIGNMENT OF AN L-SHAPED CORNER IS ALTERED BY MANUAL ASSIGNMENT OPERATION
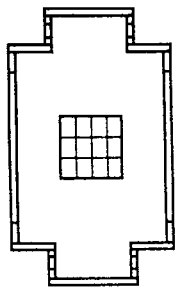
THE ASSIGNMENT OF A RECTANGULAR HOLE IS ALTERED BY MANUAL ASSIGNMENT OPERATION
UPDATING ⇑
LEARNING ⇑ THE PRIORITY IS ALTERED BY A MANUAL ASSIGNMENT OPERATION OF THE OPERATOR
LEARNING PROCESS
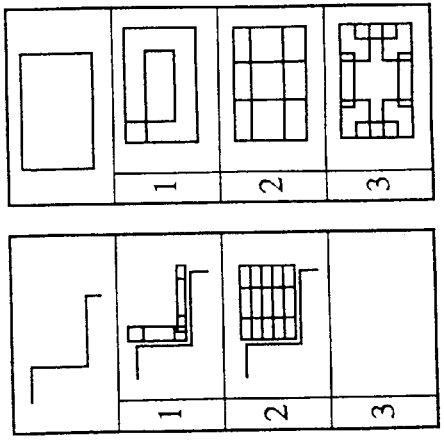
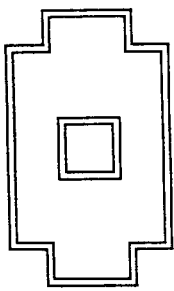
ASSIGNMENT BY REFERRING TO THE SPECIFIED MACHINING RULE GROUP
REFERENCING

| NAME OF TEMPLATE | 105021 | | | | | | | | | | | | |
|---|---|---|---|---|---|---|---|---|---|---|---|---|---|
| REPETITIVE PUNCHING FLAG | | | | | | | | | | | | | |
| KIND OF SHAPE | NOTCH | | | | | | | | | | | | |
| FIRST INCREASING ANGLE | 90 | | | | | | | | | | | | |
| RANGE OF FIRST INCREASING ANGLE | 0 | | | | | | | | | | | | |
| NUMBER OF ELEMENTS | 5 | | | | | | | | | | | | |

| ELEMENT NUMBER | KIND OF LINE | CIRCULAR ARC INCREASING ANGLE | RANGE OF CIRCULAR ARC INCREASING ANGLE | INCREASING ANGLE | RANGE OF INCREASING ANGLE | DIRECTIONAL ANGLE | PARALLEL ELEMENT | ELEMENTS ON THE SAME LINE | ELEMENTS WITH SAME LENGTH | COMPARISON IN LENGTH | MAXIMUM LENGTH | MINIMUM LENGTH |
|---|---|---|---|---|---|---|---|---|---|---|---|---|
| 1 | LINE | 0 | 0 | UNDEF_DBL | 4 | 0 | -3 | UNDEF_INT | 5 | UNDEF_INT | UNDEF_DBL | UNDEF_DBL |
| 2 | LINE | 0 | 0 | UNDEF_DBL | 4 | 0 | UNDEF_INT | UNDEF_INT | 4 | UNDEF_INT | UNDEF_DBL | UNDEF_DBL |
| 3 | LINE | 0 | 0 | UNDEF_DBL | 4 | 0 | -3 | UNDEF_INT | UNDEF_INT | UNDEF_INT | UNDEF_DBL | UNDEF_DBL |
| 4 | LINE | 0 | 0 | UNDEF_DBL | 4 | 0 | UNDEF_INT | UNDEF_INT | 2 | UNDEF_INT | UNDEF_DBL | UNDEF_DBL |
| 5 | LINE | 0 | 0 | 90 | 0 | 0 | -3 | UNDEF_INT | 1 | UNDEF_INT | UNDEF_DBL | UNDEF_DBL |
| 6 | | | | | | | | | | | | |
| 7 | | | | | | | | | | | | |
| 8 | | | | | | | | | | | | |
| 9 | | | | | | | | | | | | |
| 10 | | | | | | | | | | | | |
| 11 | | | | | | | | | | | | |
| 12 | | | | | | | | | | | | |
| 13 | | | | | | | | | | | | |
| 14 | | | | | | | | | | | | |

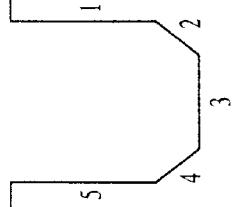

FIG. 11

| Element No. | Increasing Angle |
|---|---|
| 1 | 0 |
| 2 | 0 |
| 3 | 0 |
| 4 | 0 |
| 5 | 90 |

MULTI-DIRECTIONAL NIBBLING

| ROTATIONAL ANGLE | MACHINING CLASSIFICATION | PUNCHING PATTERN CONDITION | KIND OF SHAPE | POINT1 | POINT2 | POINT3 | POINT4 | PUNCHING PATTERN | PROTRUSION AMOUNT 1 | PROTRUSION AMOUNT 2 | PROTRUSION AMOUNT 3 | PROTRUSION AMOUNT 4 | RESTRICTION OF THE NUMBERS OF PUNCHINGS |
|---|---|---|---|---|---|---|---|---|---|---|---|---|---|
| UNDEF_DBL | UNDEF_INT | | RECTANGULAR | V1X, V1Y | V2X, V2Y | V5X, V5Y | V6X, V6Y | RECTANGULAR GRID | 0 | 0 | 0 | — | ONE PUNCH |
| | | | RECTANGULAR | V3X, V5Y | V3X, V3Y | V4X, V4Y | V4X, V5Y | RECTANGULAR GRID | 0 | 0 | 0 | — | ONE PUNCH |
| | | | TRIANGLE | V2X, V2Y | V3X, V3Y | V3X, V2Y | N/A | TRIANGLE FIRST | 0 | 1 | 1 | UNDEF_DBL | ONE PUNCH |
| | | | TRIANGLE | V4X, V4Y | V5X, V5Y | V4X, V5Y | N/A | TRIANGLE FIRST | 0 | 1 | 1 | UNDEF_DBL | ONE PUNCH |

MULTI-DIRECTIONAL NIBBLING

| MACHINING CLASSIFICATION | PUNCHING PATTERN CONDITION | KIND OF SHAPE | POINT1 | POINT2 | POINT3 | POINT4 | PUNCHING PATTERN | PRO-TRUSION AMOUNT 1 | PRO-TRUSION AMOUNT 2 | PRO-TRUSION AMOUNT 3 | PRO-TRUSION AMOUNT 4 | RESTRICTION OF THE NUMBERS OF PUNCHINGS |
|---|---|---|---|---|---|---|---|---|---|---|---|---|
| UNDEF_INT | | RECTANGULAR | V1X, V1Y | V2X, V2Y | V3X, V2Y | V3X, V1Y | RECTANGULAR GRID | 0 | 0 | 0 | — | ONE PUNCH |
| | | RECTANGULAR | V3X, V6Y | V3X, V3Y | V4X, V4Y | V4X, V6Y | RECTANGULAR GRID | 0 | 0 | 0 | — | ONE PUNCH |
| | | RECTANGULAR | V4X, V6Y | V4X, V5Y | V5X, V5Y | V6X, V6Y | RECTANGULAR GRID | — | 0 | 0 | — | ONE PUNCH |
| | | TRIANGLE | V2X, V2Y | V3X, V3Y | V3X, V2Y | N/A | TRIANGLE FIRST | 0 | — | — | UNDEF_DBL | ONE PUNCH |
| | | TRIANGLE | V4X, V4Y | V5X, V5Y | V4X, V5Y | N/A | TRIANGLE FIRST | 0 | — | — | UNDEF_DBL | ONE PUNCH |

AUTOMATIC PROGRAMMING METHOD FOR PUNCH PRESS AND APPARATUS FOR THE SAME

BACKGROUND OF THE INVENTION

1. Field of the Invention

The present invention generally relates to a punch press for machining a workpiece to produce a desired product by performing one or more punching operations. More particularly, the present invention relates to a method of automatically preparing a program for machining a workpiece with a punch press and also to an apparatus to be used for such a method.

2. Background and Material Information

Conventional punch press machines typically include a clamp device for holding a workpiece. Such a clamp device may be adapted for biaxial translation to align a desired spot or portion of the workpiece to be punched with a punch and a die prior to the actual punching operation.

An automatic programming apparatus is typically used for preparing a machining program for machining workpieces on a punch press of the type under consideration.

The operation of preparing a machining program normally proceeds in a manner as will be described hereinafter. First, an operator inputs graphic data to be used for the machining operation and selects one of the machining methods, registered in advance in the automatic programming apparatus, which is in the operator's view is the most appropriate for the graphic image the operator has entered. Then, the automatic programming apparatus prepares a machining program, by automatically selecting one or more metal tools, machining loci for the selected tools, a set of machining parameters and other factors. If the graphic image to be used for the machining operation contains any inappropriate portions that have to be modified for reasons that may include the lack of metal tools assignable to those portions, the operator manually carries out the necessary modifications, using techniques such as adding, replacing, and/or removing elements of the program, in order to produce a machining program that is free from deficiencies.

However, with such an automatic programming apparatus, it is difficult even for skilled operators, to say nothing of those who are unskilled, to prepare a machining program that is appropriate for a selected graphic image for machining in a short period of time. Additionally, when a program prepared by a skilled operator using such an automatic programming apparatus is compared with a program prepared by an unskilled person, the former produces products of a higher quality with a shorter machining time, providing a problem to be solved for an automatic programming apparatus.

The first problem arises from the fact that, if a machining method appropriate for the entered graphic image is selected out of a plurality of machining methods stored in advance in the automatic programming apparatus, the machining program prepared for the selected machining method often contains deficiencies that require corrections. As a result, the time for correcting operations to make the entire process of preparing a machining program good for the selected graphic image for machining is extremely time consuming.

On the other hand, the second problem is attributable to the fact that a skilled operator has a large amount of know-how in terms of the selection of appropriate metal tools and the generation of machining loci for the selected tools and other aspects necessary for improving the quality of the manufactured products. These skills reduce the manufacturing time as compared with an unskilled operator and the difference in the amount of know-how is reflected in the quality of the manufactured products and the machining time required for manufacturing the products.

Under these circumstances, there has long been a demand among those involved in this technological field for a new technological development that provides a better method for preparing a machining program for a given graphic image and for machining in a short period of time, regardless of the level of the skill of the operator. There is also a need for an improved method for preparing a machining program that is adapted for manufacturing a punched product according to the prepared machining program and meeting a required level in terms of quality and machining time also regardless of the level of the skill of the operator.

SUMMARY OF THE INVENTION

In view of the above-described problems, it is therefore an object of the present invention to provide a method and an apparatus for automatically preparing a machining program based on a given graphic image for machining in a short period of time regardless of the level of the skill of the operator. Another object of the invention is to provide such a method and apparatus that maintains both the quality of the product punched according to the prepared machining program and the time required for producing the product to a level for both skilled and unskilled operators.

According to an aspect of the invention, the above objects are achieved by providing an automatic programming method to be used for preparing a machining program for a punch press, wherein the method includes: registering characteristic portions of graphic images to be used for machining in the form of profiles of a plurality of templates and machining design data corresponding to the respective profiles of the templates and including machining methods adapted to the respective profiles of the templates in the form of template machinings; extracting a specific characteristic portion out of the graphic image given for a machining operation; collating the extracted characteristic portion and each of the registered template profiles; reading out the template machinings for the template profiles recognized to be corresponding to the extracted characteristic portion as a result of the collation; and automatically preparing a machining program by assigning related machining design data to the extracted characteristic portion according to the read out template machinings.

With the above arrangement, characteristic portions of graphic images to be used for machining in the form of profiles of a plurality of templates are registered in advance along with machining design data corresponding to the respective profiles of the templates and including machining methods adapted to the respective profiles of the templates in the form of template machinings. Then, a specific characteristic portion is extracted out of the graph image given for a machining operation and the extracted characteristic portion is collated with each of the registered template profiles. Thereafter, the template machinings for the template profile recognized to be corresponding to the extracted characteristic portion as a result of the collation are read out from the registered data. Finally, the related machining design data are assigned to the extracted characteristic portion according to the read out template machinings to automatically prepare a machining program for a punch press. Therefore, since machining design data corresponding to the respective profiles of the templates and including machining methods adapted to the respective profiles of the templates are registered in advance in the form of template machinings and a machining program is automatically prepared by referring to the registered data and assigning the related machining design data to the characteristic portion contained in the graphic image given for a machining operation, a machining program adapted to the given graphic image for machining can be prepared in a short period of time regardless if the operator is skilled or unskilled. Additionally, if the template machinings to be registered corresponding to the respective profiles of the templates are designed on the basis of the machining know-how of skilled operators, the quality and the machining time of the products manufactured by means of a punch press with a program prepared according to a method of the invention can be held to a certain satisfactory level even when the program is prepared by an unskilled operator.

According to another aspect of the invention, the above objects are achieved by providing an automatic programming method to be used for preparing a machining program for punch press, wherein the method comprises: registering characteristic portions of graphic images to be used for machining in the form of profiles of a plurality of templates and one or more machining design data corresponding to the respective profiles of the templates and including machining methods adapted to the respective profiles of the templates in the form of template machinings; extracting a specific characteristic portion out of the graphic image given for a machining operation; collating the extracted characteristic portion and each of the registered template profiles; reading out the template machinings for the template profiles recognized to be corresponding to the extracted characteristic portion as a result of the collation; and automatically preparing a machining program by assigning a highest priority data of one or more related machining design data to the extracted characteristic portion according to the read out template machinings.

With the above arrangement, characteristic portions of graphic images to be used for machining in the form of profiles of a plurality of templates are registered in advance along with one or more machining design data corresponding to the respective profiles of the templates and including machining methods adapted to the respective profiles of the templates in the form of template machinings. Then, a specific characteristic portion is extracted out of the graph image given for a machining operation and the extracted characteristic portion is collated with each of the registered template profiles. Thereafter, the template machinings for the template profile recognized to be corresponding to the extracted characteristic portion as a result of the collation are read out from the registered data. Finally, the highest priority data of the one or more related machining design data is assigned to the extracted characteristic portion according to the read out template machinings to automatically prepare a machining program for a punch press. Therefore, since one or more machining design data corresponding to the respective profiles of the templates and including machining methods adapted to the respective profiles of the templates are registered in advance in the form of template machinings, and a machining program is automatically prepared by referring to the registered data and a highest priority data of the one or more related machining design data is selectively assigned to the characteristic portion contained in the graphic image given for a machining operation, a machining program adapted to the given graphic image for machining can be prepared in a short period of time regardless if the operator is skilled or not.

Additionally, if the template machinings to be registered corresponding to the respective profiles of the templates are designed on the basis of the machining know-how of skilled operators, the quality and the machining time of the products manufactured by means of a punch press with a program prepared according to a method of the invention can be held to a certain satisfactory level even when the program is prepared by an unskilled operator. Still additionally, any cumbersome manual operations can be effectively avoided to realize a truly automatic programming process even when more than one machining design data are registered in correspondence to a single characteristic portion, because the highest priority data of the one or more related machining design data is selectively assigned to the characteristic portion contained in the graphic image given for a machining operation.

In a preferred embodiment, the highest priority is given to a most recently registered machining design data. Such an embodiment is particularly suited for automatic programming operations where the most recently registered machining design data is repeatedly used, because the highest priority is given to the most recently registered machining design data.

In another preferred embodiment, higher priority is given to more frequently used machining design data. Such an embodiment is particularly suited for automatic programming operations regardless of the operational environment, because higher priority is given to more frequently used machining design data.

According to a further aspect of the invention, the above objects are achieved by providing an automatic programming apparatus to be used for preparing a machining program for a punch press, wherein the apparatus includes: a machining rule memory means for registering characteristic portions of graphic images to be used for machining in the form of profiles of a plurality of templates and machining design data corresponding to the respective profiles of the templates and including machining methods adapted to the respective profiles of the templates in the form of template machinings; a characteristic extracting means for extracting a specific characteristic portion out of the graphic image given for a machining operation; a collating means for collating the extracted characteristic portion and each of the registered template profiles; a machining design data reading out means for reading out the template machinings for the template profiles recognized to be corresponding to the extracted characteristic portion as a result of the collation; and a machining program preparing means for automatically preparing a machining program by assigning related machining design data to the extracted characteristic portion according to the read out template machinings.

With the above arrangement, the characteristic extracting means extracts a specific characteristic portion out of the graphic image given for a machining operation. Then, the collating means collates the characteristic portion extracted by the characteristic extracting means and each of the registered template profiles and, upon receiving the result of the collation, the machining design data reading out means reads out the template machinings for the template profiles recognized to be corresponding to the extracted characteristic portion as a result of the collation. The machining program preparing means assigns the related machining design data to the extracted characteristic portion according to the read out template machinings to automatically prepare a machining program to be used for a punch press. Therefore, since machining design data corresponding to the respective profiles of the templates and including machining methods adapted to the respective profiles of the templates are registered in advance in the form of template machinings and a machining program is automatically prepared by referring to the registered data and assigning the related machining design data to the characteristic portion contained in the graphic image given for a machining operation, a machining program adapted to the given graphic image for machining can be prepared in a short period of time regardless if the operator is skilled or unskilled. Additionally, if the template machinings to be registered corresponding to the respective profiles of the templates are designed on the basis of the machining know-how of skilled operators, the quality and the machining time of the products manufactured by means of a punch press with a program prepared according to a method of the invention can be held to a certain satisfactory level even when the program is prepared by an unskilled operator.

According to a still further aspect of the invention, the above objects are achieved by providing an automatic programming apparatus to be used for preparing a machining program for punch press, wherein the apparatus comprises: a machining rule memory means for registering characteristic portions of graphic images to be used for machining in the form of profiles of a plurality of templates and one or more machining design data corresponding to the respective profiles of the templates and including machining methods adapted to the respective profiles of the templates in the form of template machinings; a priority updating means for updating a priority of the machining design data registered in the machining rule memory means in the form of template machinings; a characteristic extracting means for extracting a specific characteristic portion out of the graphic image given for a machining operation; a collating means for collating the extracted characteristic portion and each of the registered template profiles; a machining design data reading out means for reading out the template machinings for the template profiles recognized to be corresponding to the extracted characteristic portion as a result of the collation; and a machining program preparing means for automatically preparing a machining program by assigning a highest priority data of related machining design data to the extracted characteristic portion according to the read out template machinings.

With the above arrangement, the characteristic extracting means extracts a specific characteristic portion out of the graphic image given for a machining operation. Then, the collating means collates the characteristic portion extracted by the characteristic extracting means and each of the registered template profiles and, upon receiving the result of the collation, the machining design data reading out means reads out the template machinings for the template profiles recognized to be corresponding to the extracted characteristic portion as a result of the collation. The machining program preparing means selectively assigns the highest priority data of related machining design data to the extracted characteristic portion according to the read out template machinings to automatically prepare a machining program to be used for punch press. Therefore, since one or more machining design data corresponding to the respective profiles of the templates and including machining methods adapted to the respective profiles of the templates are registered in advance in the form of template machinings and a machining program is automatically prepared by referring to the registered data and selectively assigning the highest priority data of the one or more related machining design data to the characteristic portion contained in the graphic image given for a machining operation, a machining program adapted to the given graphic image for machining can be prepared in a short period of time regardless if the operator is skilled or unskilled. Additionally, if the template machinings to be registered corresponding to the respective profiles of the templates are designed on the basis of the machining know-how of skilled operators, the quality and the machining time of the products manufactured by means of a punch press with a program prepared according to a method of the invention can be held to a certain satisfactory level even when the program is prepared by an unskilled operator. Still additionally, any cumbersome manual operations can be effectively avoided to realize a truly automatic programming process even when more than one machining design data are registered in correspondence to a single characteristic portion because the highest priority data of the one or more related machining design data is selectively assigned to the characteristic portion contained in the graphic image given for a machining operation.

In a preferred embodiment, the priority updating means gives the highest priority to a most recently registered machining design data. Such an embodiment is particularly suited for automatic programming operations where the most recently registered machining design data is repeatedly used, because the priority updating means gives the highest priority to the most recently registered machining design data.

In another preferred embodiment, the priority updating means gives higher priority to more frequently used machining design data. Such an embodiment is particularly suited for automatic programming operations regardless of the operational environment, because the priority updating means gives higher priority to more frequently used machining design data.

The nature, principle and utility of the invention will become more apparent from the following detailed description when read in conjunction with the accompanying drawings.

BRIEF DESCRIPTION OF THE DRAWINGS

In the accompanying drawings:

FIG. 5 is a flow chart of a learning operation conducted according to an aspect of the present invention;

FIG. 11 includes a table that illustrates exemplary template data for a template profile;

FIGS. 14A and 14B contain exemplary machining design data for the template profile represented by the template data in FIG. 11.

DETAILED DESCRIPTION OF THE PREFERRED EMBODIMENTS

An automatic programming method for punch press and an apparatus to be used for such a method according to the invention will be described by referring to the accompanying drawings that illustrate preferred embodiments of the invention.

Figure 1:
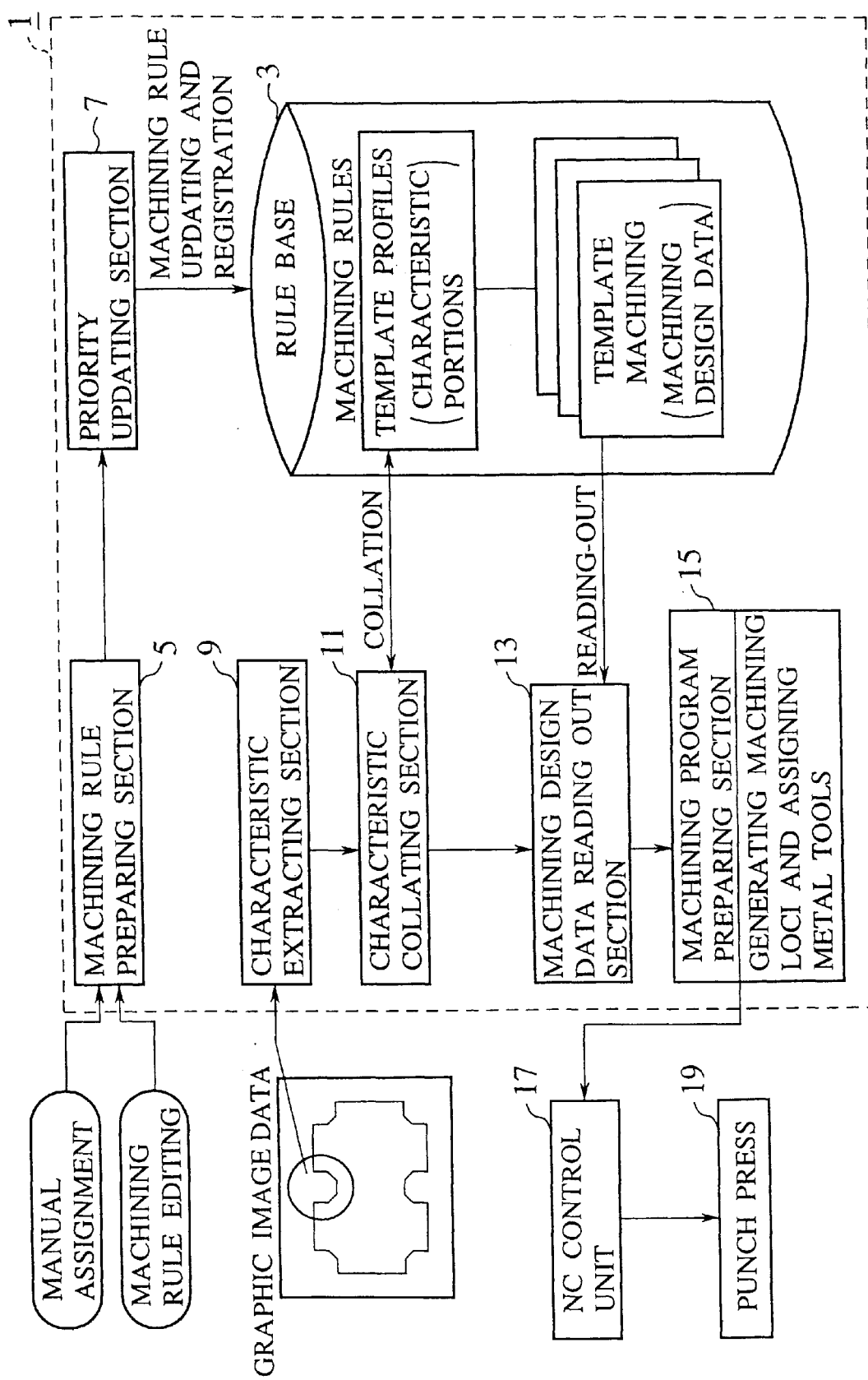
FIG. 1 is a schematic block diagram of an embodiment of an automatic programming apparatus to be used for punch press, according to an aspect of the invention.

A configuration of an embodiment of an automatic programming apparatus for a punch press, according to an aspect of the invention, will firstly be described by referring to the schematic of FIG. 1. As shown in FIG. 1, an automatic programming apparatus 1 comprises a rule base 3 operating as a machining rule memory means for registering data for characteristic portions of graphic images to be used for machining (hereinafter referred to as graphic images for machining) in the form of profiles of templates and for registering machining design data corresponding to the respective profiles of the templates. The machining design data may include the machining methods adapted for the respective profiles of the templates in the form of template machinings so that the automatic programming apparatus automatically prepares a machining program by referring to the contents of registration of the rule base 3 and assigning a related machining design data to a characteristic portion contained in the graphic image given for machining.

Figure 2:
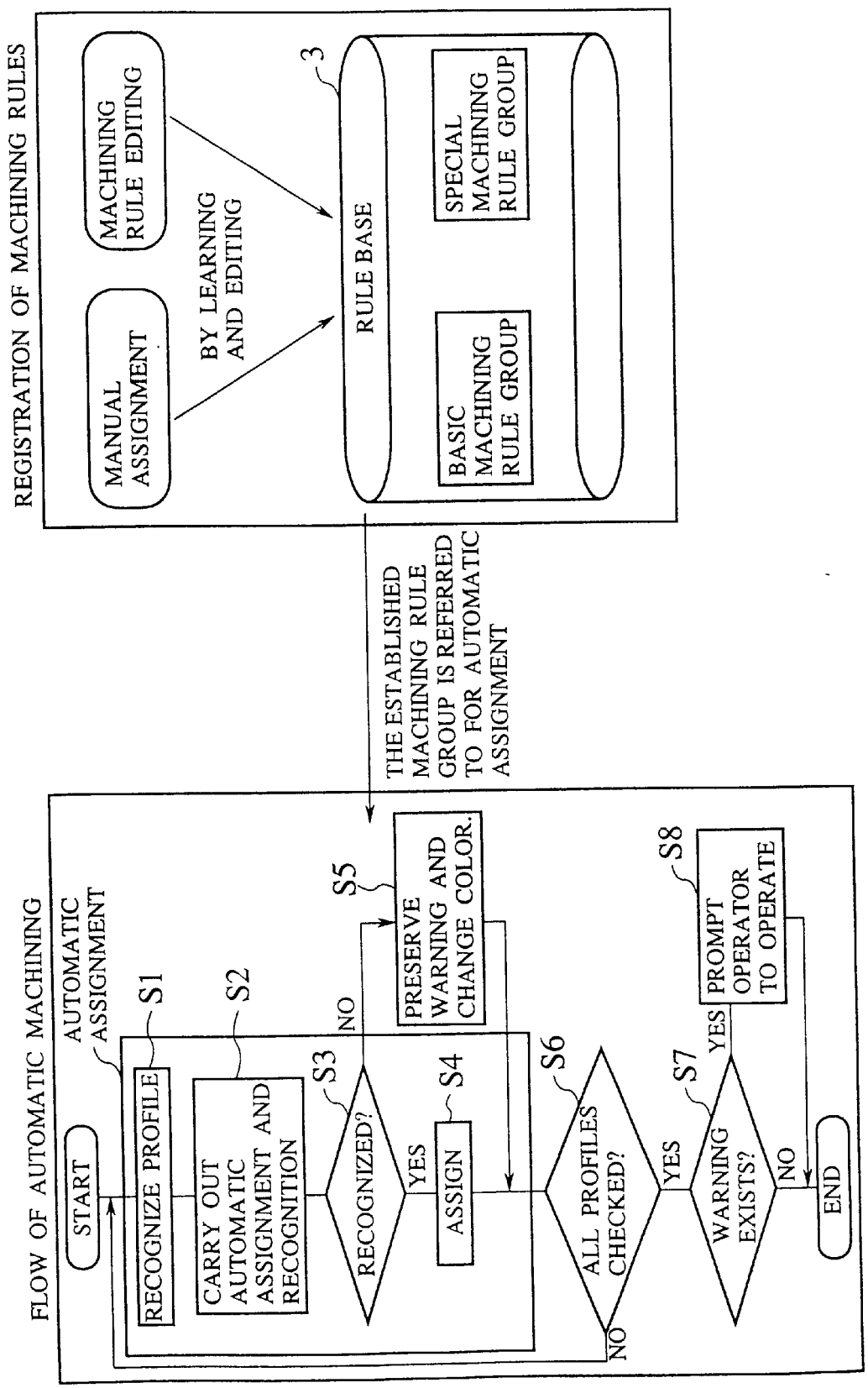
FIG. 2 is a flow chart of an operation of automatically preparing a machining program with the embodiment of FIG. 1.
Figure 8:
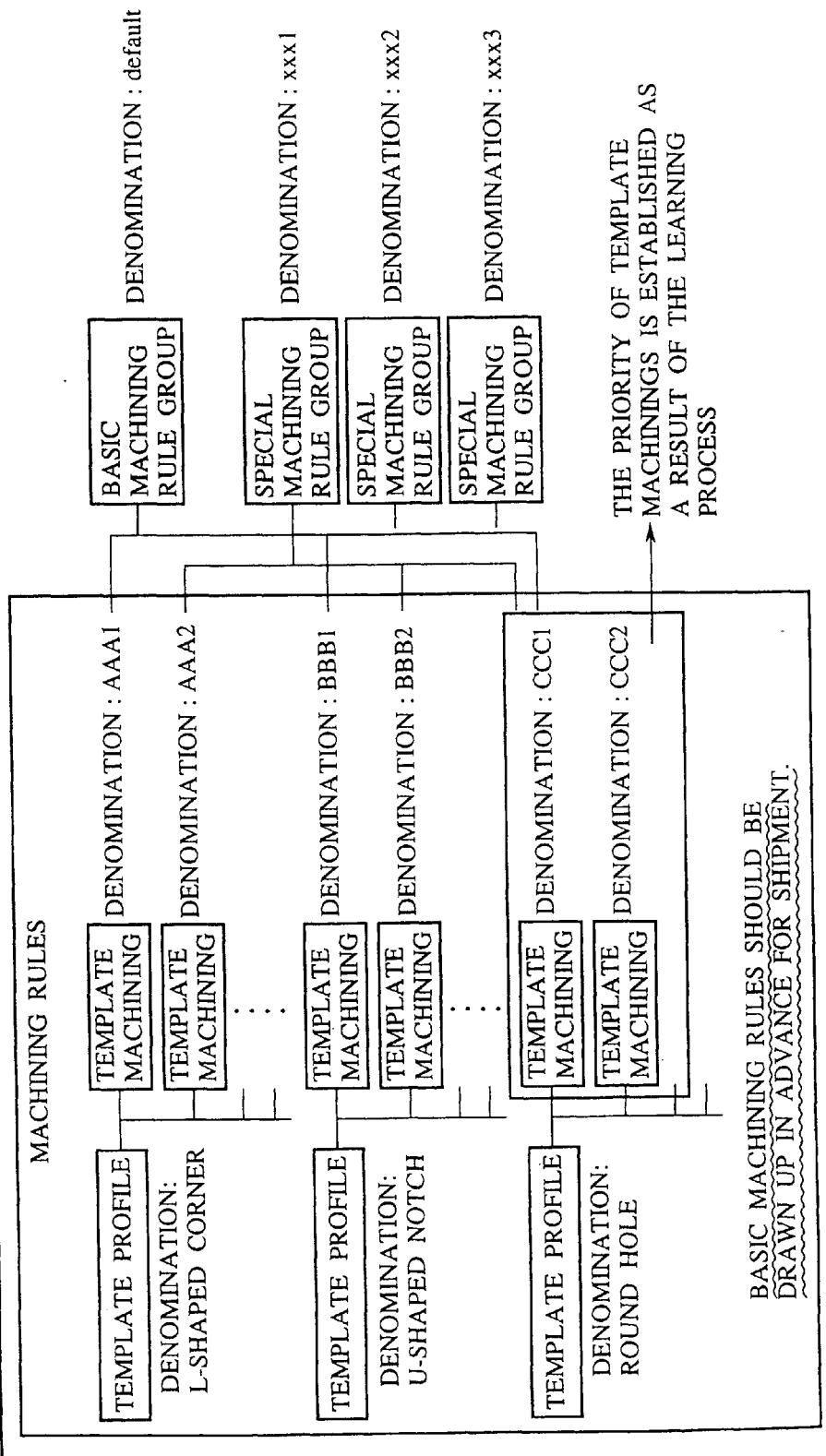
FIG. 8 is a schematic illustration showing an exemplary hierarchical structure of machining rules.

More specifically, the automatic programming apparatus 1 comprises a machining rule formulating or preparing section 5 for newly drawing up or editing machining rules according to a manual assignment entered by the operator or according to a given edition of machining rules, and a priority updating section 7 for updating the machining rules drawn up or edited in the machining rule preparing section 5 with the highest priority given to the machining design data manually assigned or edited for the last time and registering them to the rule base 3. The machining rules comprise data generated for machining loci, each of which is adapted to the profile of a particular template, such as a round hole, an L-shaped corner or a rectangular hole, and one or more machining design data in the form of one or more template machinings including data for machining processes, such as data for tool selection or tool assignment, data for punching out a round hole in a single punching action, and data for cutting an L-shaped corner with repetitive punching actions. As illustrated in FIGS. 2 and 8, the machining rules registered in the rule base 3 may be classified into a group of basic machining rules including default values defined for typical template profiles on the basis of the know-how collected from skilled operators, and a group of special machining rules including machining rules for special user applications such as machining rules for sashes and doors. Thus, the operator can select either the group of basic machining rules or that of special machining rules prior to the preparation of a machining program for a graphic image for machining. If the operator does not select either group, the registered machining rules may be so arranged that a predetermined one of the groups is provided with a higher priority and hence referred to firstly for the current operation of preparing a machining program.

The automatic programming apparatus 1 further comprises a characteristic extracting section 9 operating as characteristic extracting means for extracting a specific characteristic portion (such as a notch) of a graphic image for machining, and a characteristic collating section 11 operating as characteristic collating means for collating the characteristic portion extracted by the characteristic extracting section 9 and each of the template profiles registered in the rule base 3. The automatic programming apparatus 1 also includes a machining design data reading out section 13 operating as machining design data reading out means for reading out the template machinings for the template profiles recognized to be corresponding to the extracted characteristic portion as a result of the collation, and a machining program preparing section 15 operating as a machining program preparing means for automatically preparing a machining program by selectively assigning the highest priority data of the related one or more machining design data that is updated by the priority updating section 7 to the extracted characteristic portion according to the read out template machinings. The machining program automatically prepared by the machining program preparing section 15 is then transferred to an NC control unit 17 and, upon receiving the machining program, the NC control unit 17 causes the punch press 19 to carry out a punching operation according to the machining program.

The operation and logic flow of learning and registration according to an embodiment of the automatic programming apparatus of the present invention will now be described by referring to the flow charts of FIGS. 3 and 5.

Figure 3:
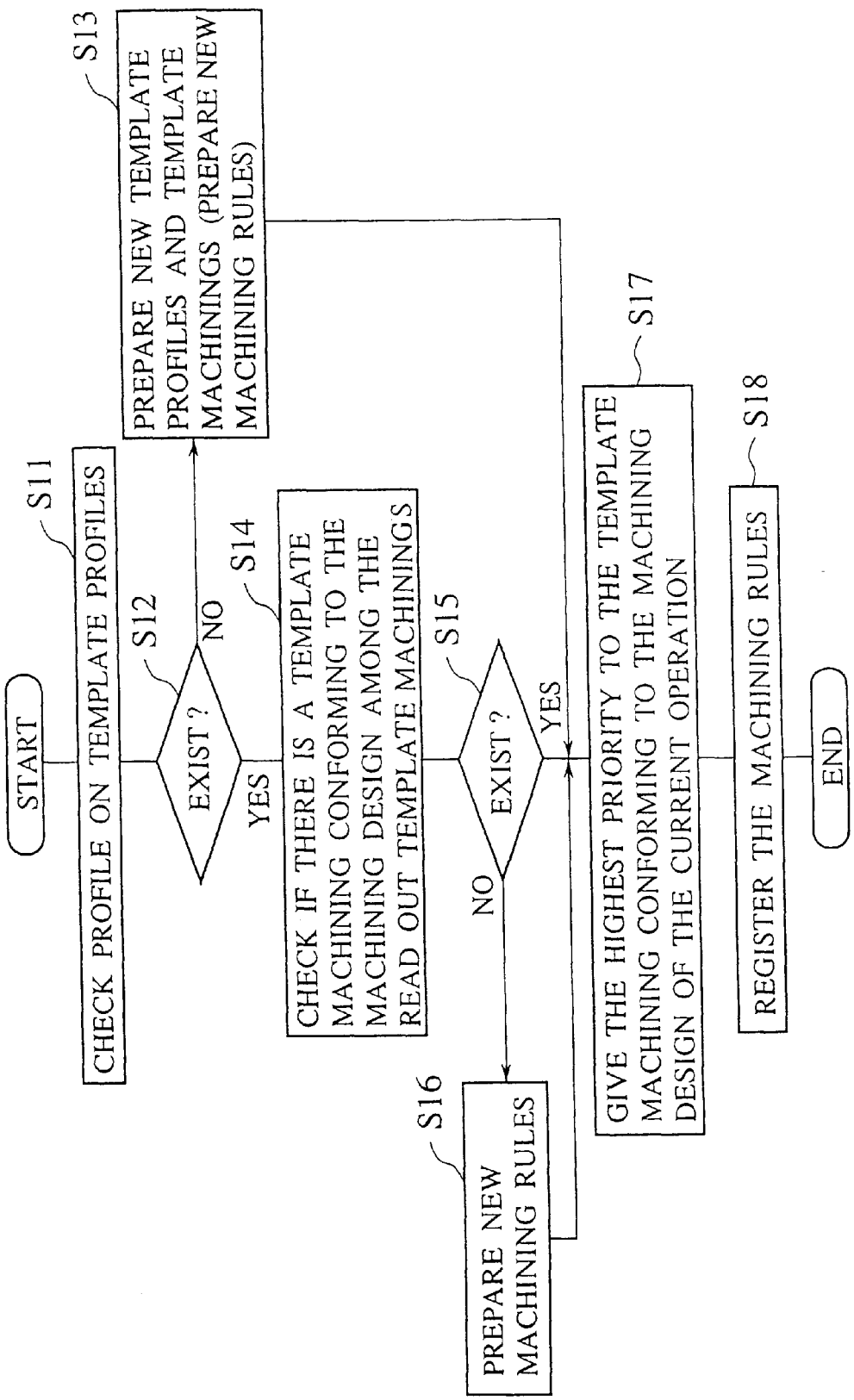
FIG. 3 is a flow chart of an operation of learning and registering with the embodiment of FIG. 1.
Figure 9A:
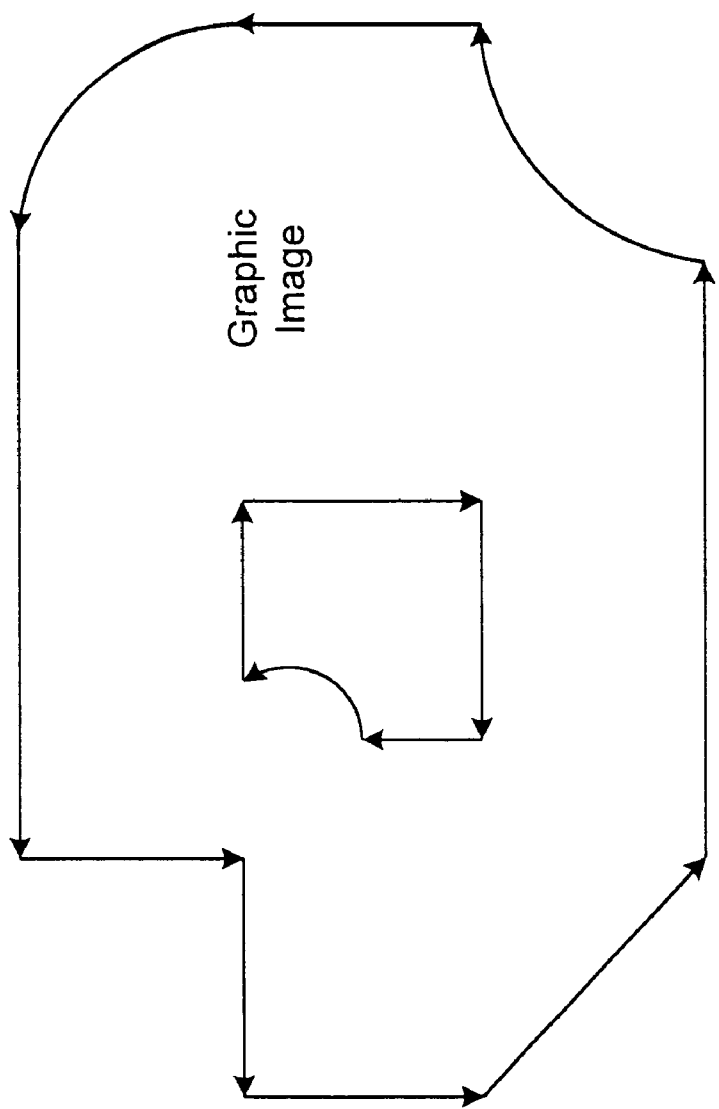
FIG. 9A illustrates an exemplary graphic image constructed with straight line and circular arc data.
Figure 9B:
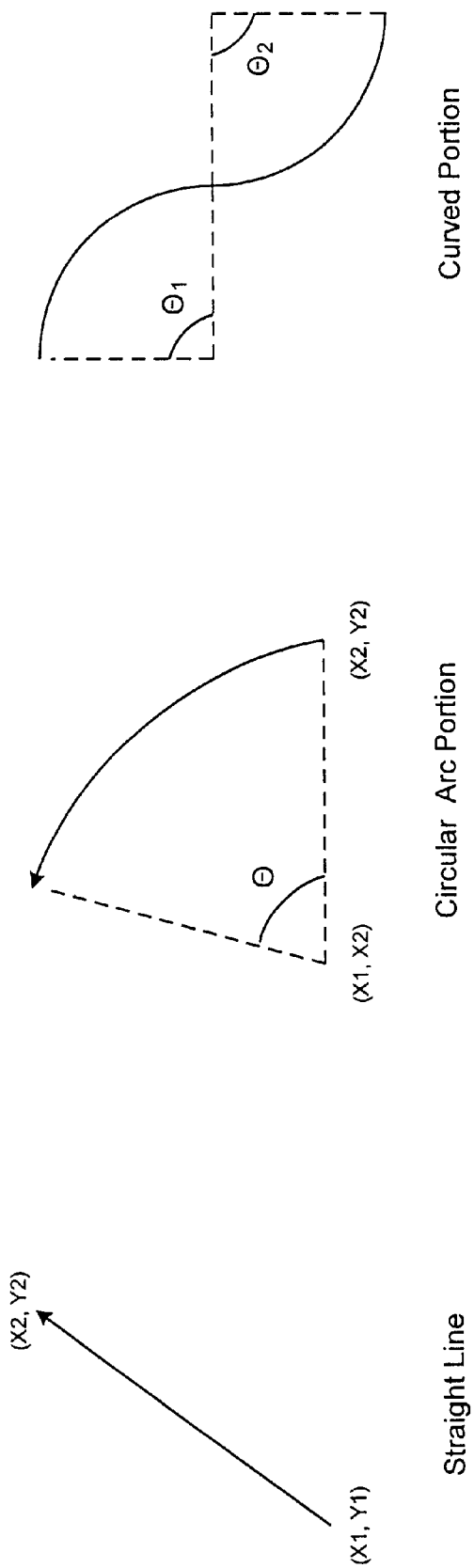
FIG. 9B illustrates exemplary representations of a straight line, a circular arc, and a curved portion.

As shown in FIG. 3, in Step S11, the characteristic extracting section 9 extracts a characteristic portion of the graphic image for machining, such as an L-shaped corner or a rectangular hole (see, for example, FIG. 5) so that the characteristic collating section 11 may check or compare the characteristic portion with the template profiles registered in the rule base 3. The graphic image representing the workpiece may be composed of straight line data and circular arc data (see, for example, FIG. 9A). In such a case, a straight line may be represented by coordinate data representing the start point and the end point of each line. Further, a circular arc may be represented by coordinate data of a center point, a coordinate of one end of the circular arc, and an angle of the circular arc. In addition, sinusoidal or curved portions in a graphic image may be divided into a plurality of circular arcs and may be represented by approximating each curved portion with the coordinate data for one or more circular arcs. FIG. 9A illustrates an exemplary graphic image that is constructed or composed of straight line and circular arc coordinate data. Further, FIG. 9B illustrates examples of coordinate representations for a straight line, a circular arc portion, and a curved portion.

Figure 10:
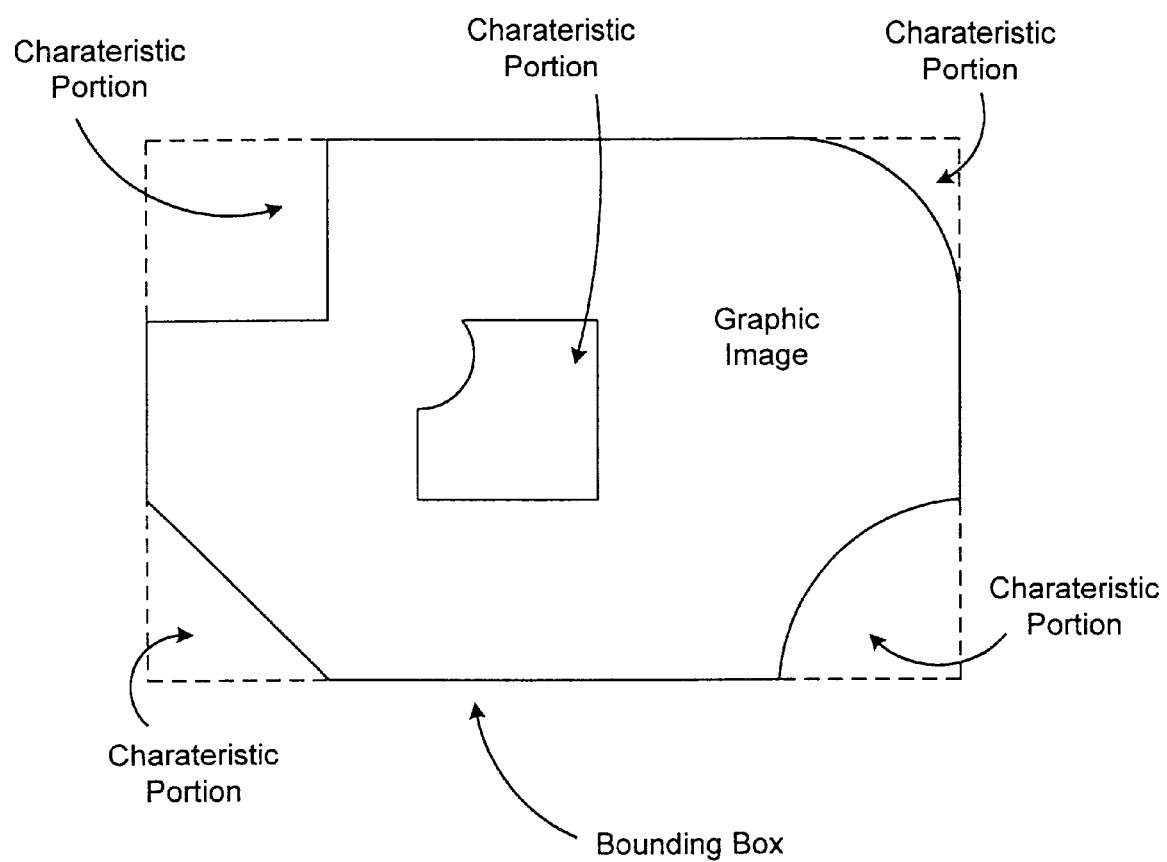
FIG. 10 illustrates an exemplary bounding box for extracting characteristic portions of a graphic image, in accordance with an aspect of the present invention.

In order to extract the characteristic portions of a graphic image, a bounding box may be employed by the characteristic extracting portion 9. As shown in FIG. 10, a bounding box may be provided for each graphic image and may comprise a rectangular or square box which is defined by the maximum X-coordinate data and the maximum Y-coordinate data of the graphic image. In FIG. 10, an exemplary bounding box (illustrated with dashed lines) is provided for a graphic image. The portions or areas of the graphic image which do not overlap with the bounding box may be identified and extracted as characteristic portions by the characteristic extracting section 9.

In Step S12, the characteristic collating section 11 collates each characteristic portion of the graphic image extracted by the characteristic extracting section 9 and each of the template profiles registered in the rule base 3, and determines if the template profile recognized to be corresponding to the extracted characteristic portion as a result of the collation is found in the rule base 3 or not.

If it is so determined in Step S12 that the template profile recognized to be corresponding to the extracted characteristic portion is not found in the rule base 3, the machining rule preparing section 5 draws up, in Step S13, a new set of machining rules according to the data for machining processes, such as data for metal die selection and machining loci, manually entered by the operator.

If, on the other hand, it is determined in Step S12 that the template profile recognized to be corresponding to the extracted characteristic portion is found in the rule base 3, the machining design data reading out section 13 reads out, in Step S14, the template machinings corresponding to the template profile recognized to be corresponding to the characteristic portion extracted by the characteristic extracting section 9 and checks if there exists a template machining that conforms to the machining design among the read out template machinings to determine as a result of the checking operation if there is a template machining that conforms to the machining design among the template machinings read out in the current reading out operation (see Step S15 in FIG. 3).

If it is determined in Step S15 that there is not found any template machining conforming to the machining design in the current reading out operation, the machining rule preparing section 5 draws up, in Step S16, a new set of machining rules according to the data for machining processes, such as data for metal die selection and machining loci, manually entered by the operator.

If, on the other hand, it is determined in Step S15 that there is found a template machining conforming to the machining design or a new set of machining rules is drawn up in Steps S13 or S16, the priority updating section 7 updates the rule base 3 in Steps S17 and S18 by giving the highest priority to the template machining conforming to the machining design of the current operation or the template machining defined by the machining rules that are newly drawn up by the machining rule preparing section 5.

Figure 6:
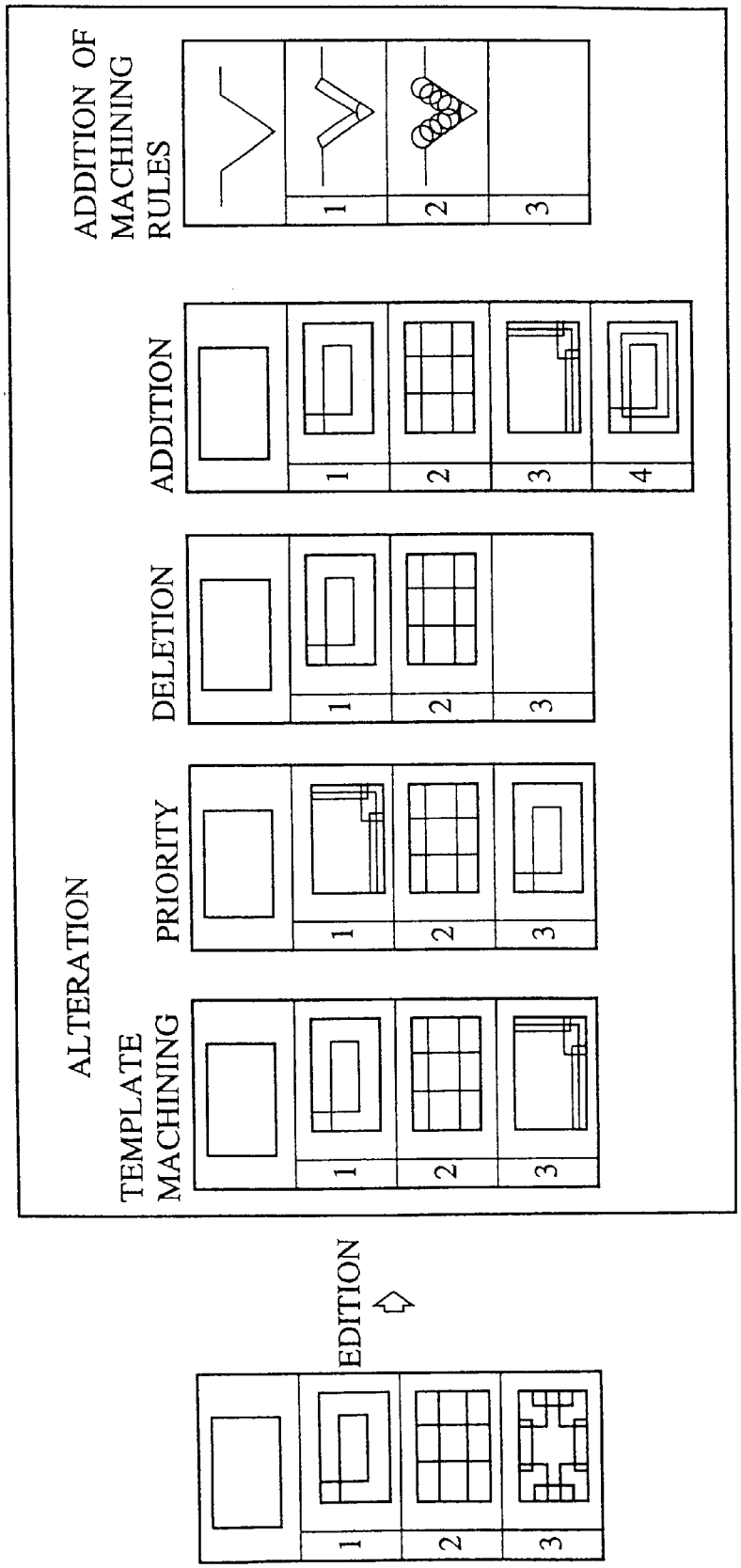
FIG. 6 is a schematic illustration showing an operation of editing machining rules.

While the flow of the learning and registering operation of the embodiment of automatic programming apparatus according to the invention is described above in terms of the highest priority given to a template machining conforming to the machining design if such a template machining is found among the template machinings read out in the current operation or if a new set of machining rules is drawn for such a template machining, the present invention is not limited thereto and may be so arranged that the highest priority is given to the template machining conforming to the machining design and registered in the rule base 3 to update the latter if the machining rules are edited to alter, delete or add certain template machinings corresponding to template profiles, as illustrated in FIGS. 5 and 6.

In the examples of FIGS. 5 and 6, one or more images (numbered "1", "2", "3", etc.) are grouped and prioritized within each template group. The numbering "1", "2", "3" etc. indicates the priority of the machining design data for template machining. The machining program preparing section 15 may search the machining design data in the order of the indicated priority. The priority may be changed by a user or automatically changed, as disclosed herein.

Each set of template data that is stored in rule base 3 may be composed of various data elements. For example, as shown in FIG. 11, the template data may include the name of the template, a repetitive punching flag, and kind of shape data. The kind of shape data may indicate if the template profile corresponds to a corner, a notch, a hole or another type of shape. In the exemplary template data of FIG. 11, the kind of shape is a notch. The template data may also include other data elements to define the template profile. For example, the template data may define the first increasing or changing angle, the range of the first increasing angle, and the number of total elements in the profile. In addition, for each element of the represented profile, the template data may include data elements that define (where appropriate): the kind of line (e.g., line, circular arc, curved portion); the circular arc increasing angle; the range of the circular arc increasing angle; the increasing angle; the range of the increasing angle; the directional angle; the parallel element; the element(s) on the same line; the element(s) with the same length; the comparison in length; the maximum length; and/or the minimum length. Similar data may also be generated and registered for the extracted characteristic portions.

Figures 12A, 12B:
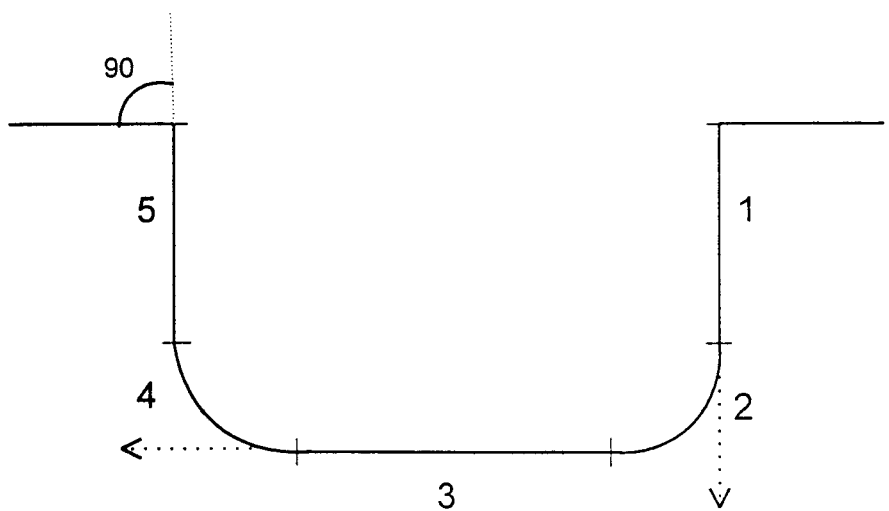
FIGS. 12A and 12B illustrate the manner in which each data element may be numbered with respect to a represented profile and the increasing angle for each element.
Figure 12C:
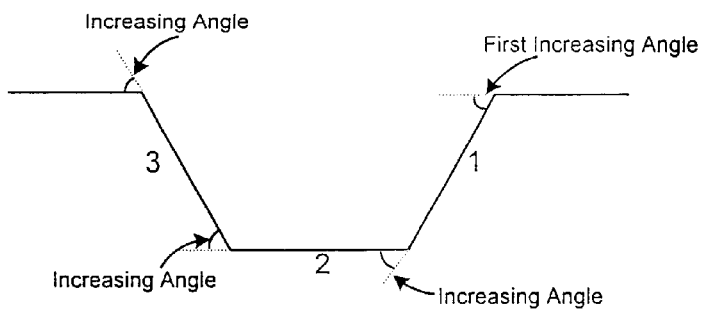
FIG. 12C illustrates the first increasing angle, the first element, and the increasing angles of another exemplary profile.
Figure 12D:
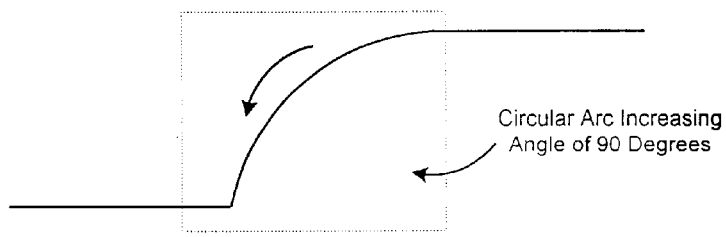
FIGS. 12D and 12E illustrate increasing angles for exemplary circular arc portions.
Figure 12E:
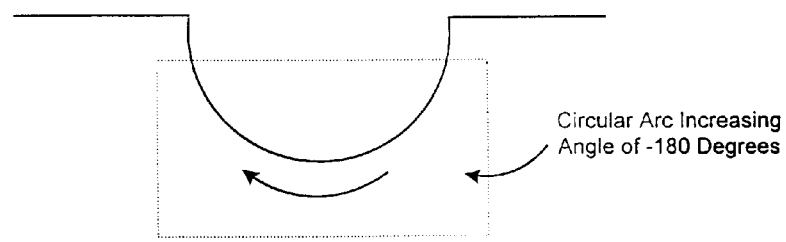

FIGS. 12A–12E illustrate the relation of various data elements that may be included with the template data for several, exemplary template profiles. For example, FIG. 12A illustrates the manner in which each data element may be numbered (i.e., "1", "2", "3", "4", and "5") with respect to a represented profile, and FIG. 12B includes a table indicating the increasing or changing angle for each element. FIG. 12C illustrates the first increasing angle, the first element, and the increasing angles of another exemplary profile. Further, for the exemplary profiles of FIGS. 12D and 12E, circular arc increasing angles are represented. In FIG. 12D, the circular arc increasing angle is 90 degrees, whereas in FIG. 12E the circular arc increasing angle is –180 degrees.

In accordance with an aspect of the invention, the increasing or changing angle may be defined to represent the angle between lines of a template profile that are not smoothly connected. In FIGS. 12A and 12C, each increasing angle is illustrated with respect to the connected lines for the exemplary template profiles. The value of the increasing angle may be represented quantitatively with the sign "+" for counterclockwise movement and the sign "–" for clockwise movement. When a line is an arc, the increasing angle may be based on the direction of the tangent to the turning point. When the line element is a straight line, the increasing angle may be based on the direction of production of the pre-pursued line. For smoothly connected line elements, the increasing angle for each line element is "0". Therefore, for the exemplary template profile of FIG. 12A, the increasing angle for each of the elements 1, 2, 3 and 4 is "0" (see, e.g., FIG. 12B), since all of the elements are smoothly connected with the next element. However, for element 5 in FIG. 12A, the next element diverges 90° counterclockwise from the direction of production of the pre-pursued line (represented by the dotted line in FIG. 12A).

According to a further aspect of the invention, a circular arc increasing angle may also be defined, as indicated above. The circular arc increasing angle, such as that represented in FIGS. 12D and 12E, may be defined differently from the increasing angle represented in FIGS. 12A–12C. That is, the circular arc increasing angle of an element may be defined irrespective of the elements next to (i.e., before or behind) that element. The value of the circular arc increasing angle may be defined based on the arc following the regular or pursued route, with the sign "+" indicating counterclockwise and the sign "−" indicating clockwise movement.

Figure 13:
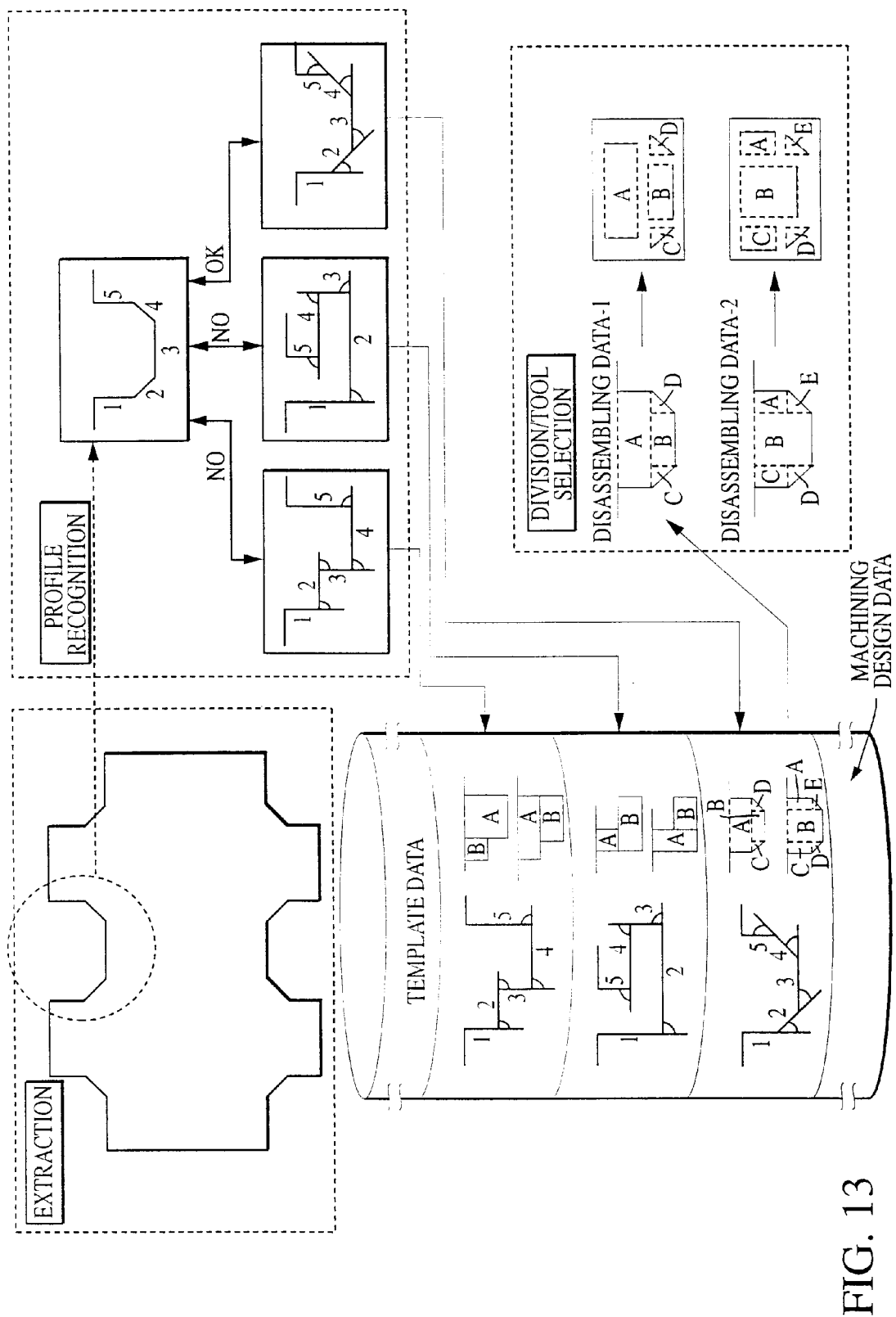
FIG. 13 illustrates, according to a further aspect of the invention, an exemplary process by which the characteristic portions are compared with the template profiles based on the template data.

As discussed above, the characteristic collating section 11 compares or collates each characteristic portion that has been extracted by the characteristic collating section 9 with each of the template profiles registered in rule base 3. To determine if an extracted characteristic portion corresponds to a registered template profile, the characteristic collating section 11 may analyze and compare the template data of the profile with the corresponding data for the extracted characteristic portion. FIG. 13 illustrates an exemplary process by which the characteristic portions are compared with the template profiles based on the template data. The comparison and collation performed by the characteristic collating section 11 may be based on a set or all of the data elements provided for the template profile. In addition, one or more of the data elements may be stressed or given a priority over other data elements when comparing data. For example, the number of elements and increasing angle data elements may be stressed and considered particularly important when making a comparison. In addition, the characteristic portions of the graphic image may be extracted and compared in a predetermined order. For example, the characteristic portions may be extracted and compared by first starting with the characteristic portion that does not over lap with the bounding box and that has the maximum X-coordinate data.

After all of the templates are determined for the characteristic portions, a machining program is generated for each characteristic portion. As discussed above, for the template profiles recognized to correspond to the characteristic portions, the template machinings or machining design data may be read out of the rule base 3 to generate machining programs for the characteristic portions. Each template profile may be registered in rule base 3 with plural machining design data, which contain data similar to that illustrated in FIGS. 14A and 14B. In FIGS. 14A and 14B, exemplary machining design data is provided for the template profile represented by the template data in FIG. 11. According to an aspect of the invention, the machining design data may include various machining design data that may be utilized by a punch press to machine the characteristic portions of the workpiece. As shown in FIGS. 14A and 14B, the machining design data may include the following data elements: the rotational angle; the machining classification; the punching pattern condition; the kind of shape to be punched or machined (e.g., square, rectangle, triangle, etc.); the point(s) or coordinate(s) for the punching or machining operations; the punching pattern (e.g., grid or triangle first); the protrusion amount; and the restriction on the number of punchings (e.g., one punch, two punches, etc.). For the template profile corresponding to the machining design data of FIGS. 14A and 14B, the profile may be formed by either punching four pieces from the workpiece consisting of two triangles and two rectangles (as shown by the dashed lines in FIG. 14A) or by punching five pieces consisting of two triangles and three rectangles. The machining design data may also include tooling data, indicating the preferred tooling for carrying out each of the punching or machining operations.

The above-described machining rule learning and registering operation for an automatic programming apparatus according to the present invention may be selectively carried out by employing ON/OFF actions or control features.

The operation of automatically preparing a machining program by means of an automatic programming apparatus for punch press according to the invention will be described by referring to FIGS. 2, 4 and 7.

Figure 4:
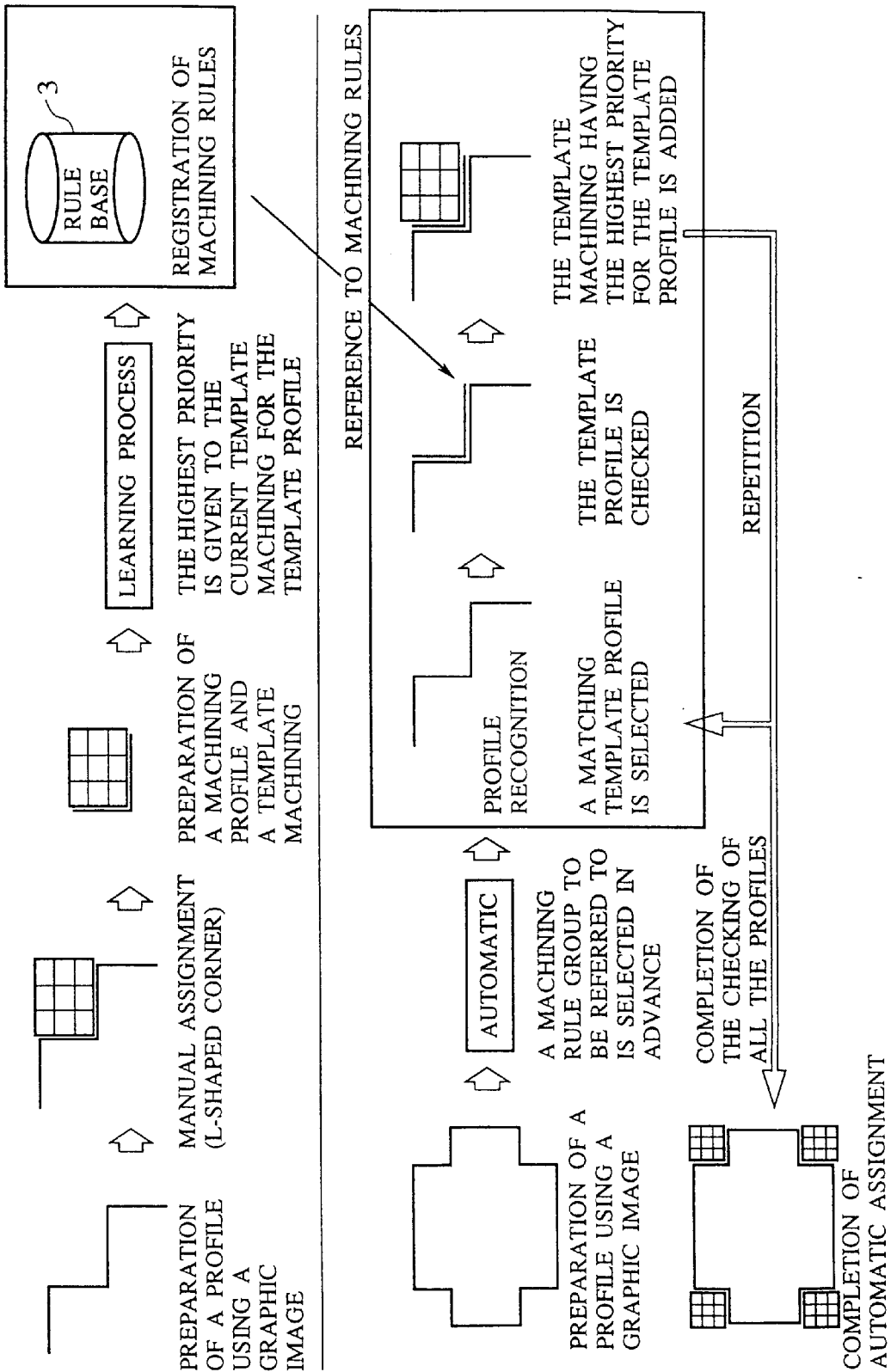
FIG. 4 is a flow chart of an operation of automatically preparing a machining program, according to an aspect of the present invention.

First, in Step S1 (see FIG. 2) for profile recognition, the characteristic extracting section 9 extracts a characteristic portion out of the machining design, such as an L-shaped corner, as shown in FIG. 4.

Then, in Steps S2 and S3 for automatic assignment, the characteristic collating section 11 collates the characteristic portion of the profile extracted by the characteristic extracting section 9 and each of the template profiles registered in the rule base 3 to determine if there are one or more than one template profiles that can be recognized to be corresponding to the characteristic portion extracted by the characteristic extracting section 9. Note that the characteristic collating section 11 is so arranged that it generously recognizes the resemblance between a template profile and a characteristic portion extracted by the characteristic extracting section 9 regardless of their dimensional relationship. Also, note that the threshold of recognition can be defined by appropriately selecting parameters such as the upper and lower limits of the length to be machined and the diameter of a hole to be punched if a round hole is to be produced.

Figure 7:
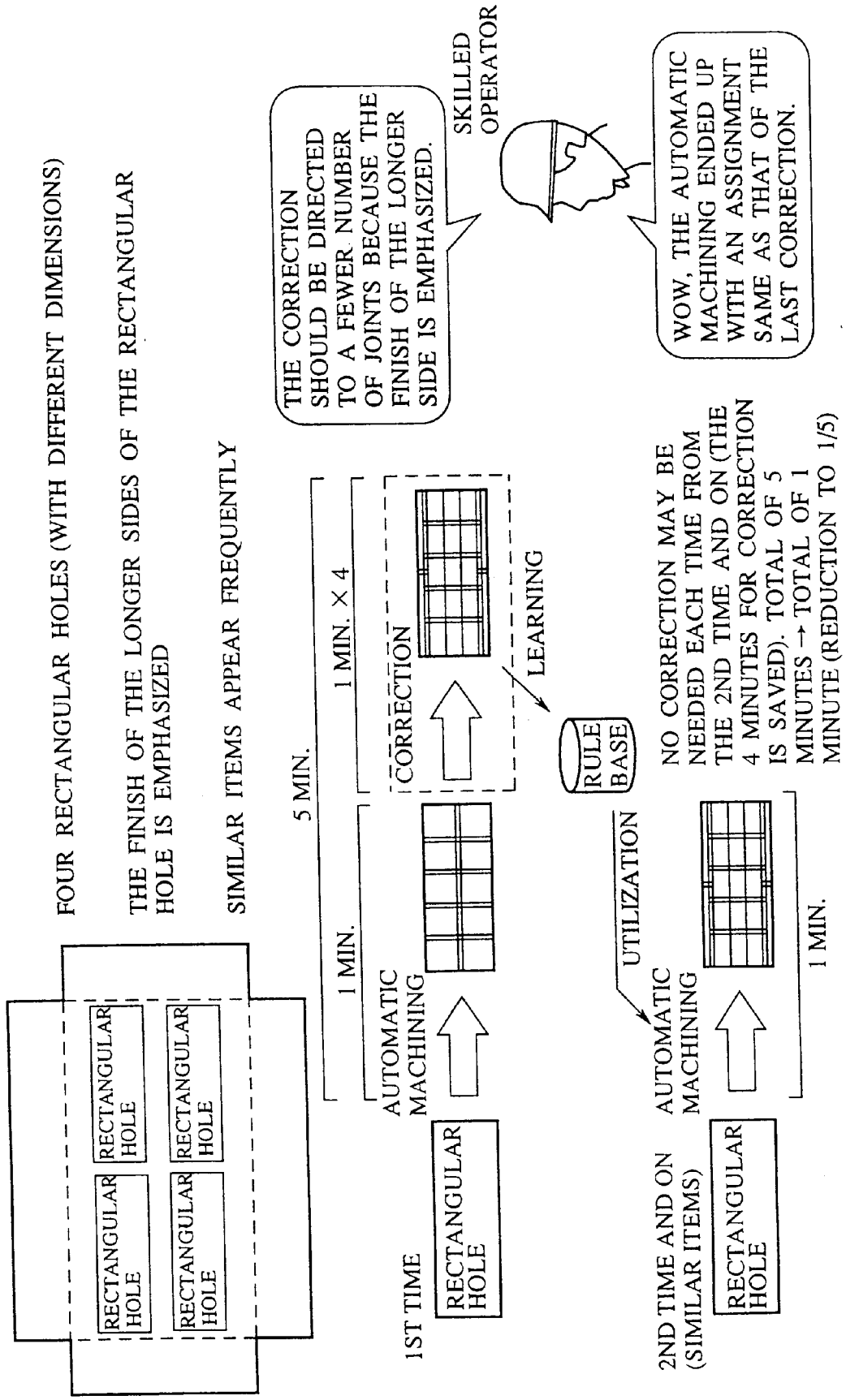
FIG. 7 is a schematic illustration showing an operation of automatically preparing a machining program with an embodiment of an automatic programming apparatus, according to an aspect of the invention.

If it is determined in Step S3 that there are one or more template profiles recognized to be corresponding to the characteristic portion extracted by the characteristic extracting section 9 in the rule base 3, then in Step S4 the machining design data reading out section 13 reads out the template machinings for the template profiles recognized to be corresponding to the extracted characteristic portion as a result of the collation and the machining program preparing section 15 automatically prepares a machining program to be used for a punch press by selectively assigning the highest priority data of the related one or more machining design data that is updated by the priority updating section 7 to the characteristic portion extracted by the characteristic extracting section 9 according to the read out template machinings, as shown in FIG. 7.

According to the dimensions of the characteristic portion, the machining program preparing section 15 may select for each characteristic portion one of the plural machining design data so that, for example, the number of punchings may become minimum. As the machining design data is determined, a machining order of the divided portions of the characteristic portion may be determined according to the selected machining design data. Each machining design data (template machining) may include or be associated with an automatic tool selection table in which tools preferable to the template machining are listed. As a result, the machining program preparing section 15 can select preferable tools according to the machining design data and the dimensions of the characteristic portion.

If, on the other hand, it is determined at Step S3 (see FIG. 2) that there is no template profile recognized to be corresponding to the characteristic portion extracted by the characteristic extracting section 9 in the rule base 3, then at Step S5 (which is a warning step) the automatic programming apparatus 1 brings itself into a warning mode for notifying the operator that there exists a portion in the graphic image to which no template profile can be automatically assigned and applies an unusual specific color (such as red) to the corresponding characteristic portion of the graphic image for machining displayed on the display of the apparatus.

Then, in Step S6, the characteristic extracting section 9 determines if the operation of extracting all the characteristic portions or profiles contained in the graphic image for machining is completed or not.

If it is determined in Step S6 that all the characteristic portions contained in the graphic image for machining are not extracted, the automatic programming apparatus 1 returns to Step S1 to repeat the above-described steps. If, however, it is determined that the operation of extracting all the characteristic portions contained in the graphic image for machining is completed, the automatic programming apparatus 1 determines at Step S7 if the apparatus is in a warning mode or not.

If it is determined at Step S7 that the automatic programming apparatus 1 is in a warning mode, then at Step S8 the apparatus moves into a stand-by mode and waits for an operator's manual operation for restoring the normal state of the apparatus. The manual operation may include manually assigning template profiles to the characteristic portion in question. If, on the other hand, It is determined at Step S7 that the automatic programming apparatus 1 is not in a warning mode or the normal state is restored by an operator's manual assigning operation, the apparatus assumes that the entire operation of automatically preparing a machining program is over and terminates the operational sequence.

As described above, with the present invention, since one or more than one machining design data corresponding to the respective profiles of the templates and including those on the machining methods adapted to the respective profiles of the templates are registered in advance in the form of template machinings, and a machining program is automatically prepared by referring to the registered data and selectively assigning the highest priority data of the one or more than one related machining design data to the characteristic portion contained in the graphic image given for a machining operation, a machining program adapted to the given graphic image for machining can be prepared in a short period of time regardless if the operator is skilled or not. Additionally, if the template machinings to be registered corresponding to the respective profiles of the templates are designed on the basis of the machining know-how of skilled operators, the quality and the machining time of the products manufactured by means of a punch press with a program prepared according to a method of the invention can be held to a certain satisfactory level even when the program is prepared by an unskilled operator. Still additionally, any cumbersome manual operations can be effectively avoided to realize a truly automatic programming process even when more than one machining design data are registered in correspondence to a single characteristic portion, since the highest priority data of the one or more than one related machining design data is selectively assigned to the characteristic portion contained in the graphic image given for a machining operation.

If the priority updating section 7 is arranged to operate as a priority updating means that gives the highest priority to the most recently registered machining design data, then the arrangement may be particularly suited for automatic programming operations where the most recently registered machining design data is repeatedly used.

If, alternatively, the priority updating section 7 is arranged to operate as a priority updating means that gives higher priority to more frequently used machining design data, then the arrangement may be particularly suited for automatic programming operations regardless of the operational environment.

As described above in detail, according to an aspect of the invention, since machining design data corresponding to the respective profiles of the templates and including those on the machining methods adapted to the respective profiles of the templates are registered in advance in the form of template machinings and a machining program is automatically prepared by referring to the registered data and assigning the related machining design data to the characteristic portion contained in the graphic image given for a machining operation, a machining program adapted to the given graphic image for machining can be prepared in a short period of time regardless if the operator is skilled or not. Additionally, if the template machinings to be registered corresponding to the respective profiles of the templates are designed on the basis of the machining know-how of skilled operators, the quality and the machining time of the products manufactured by means of a punch press with a program prepared according to a method of the invention can be held to a certain satisfactory level even when the program is prepared by an unskilled operator.

According to another aspect of the invention, since one or more than one machining design data corresponding to the respective profiles of the templates and including those on the machining methods adapted to the respective profiles of the templates are registered in advance in the form of template machinings, and a machining program is automatically prepared by referring to the registered data and selectively assigning the highest priority data of the one or more than one related machining design data to the characteristic portion contained in the graphic image given for a machining operation, a machining program adapted to the given graphic image for machining can be prepared in a short period of time regardless if the operator is skilled or not. Additionally, if the template machinings to be registered corresponding to the respective profiles of the templates are designed on the basis of the machining know-how of skilled operators, the quality and the machining time of the products manufactured by means of a punch press with a program prepared according to a method of the invention can be held to a certain satisfactory level even when the program is prepared by an unskilled operator. Still additionally, any cumbersome manual operations can be effectively avoided to realize a truly automatic programming process even when more than one machining design data are registered in correspondence to a single characteristic portion, because the highest priority data of the one or more than one related machining design data is selectively assigned to the characteristic portion contained in the graphic image given for a machining operation.

In a preferred arrangement, the highest priority is given to the most recently registered machining design data. Such an arrangement is particularly suited for automatic programming operations where the most recently registered machining design data is repeatedly used.

In another preferred arrangement, higher priority may be given to more frequently used machining design data. Such an arrangement is particularly suited for automatic programming operations regardless of the operational environment.

It should be understood that many modifications and adaptations of the present invention will become apparent to those skilled in the art based on the present disclosure and, therefore, the present invention is intended to encompass such obvious modifications and changes that are within the scope of the claims appended hereto.

What is claimed:

1. An automatic programming method to be used for preparing a machining program for a punch press, the method comprising:

registering a plurality of template profiles and template machining data in association with each of the plurality of template profiles, each of the template profiles representing a characteristic portion of a graphic image to be used for machining, the template machining data including a machining method that achieves the associated template profile;

extracting a characteristic portion of a graphic image for a machining operation of a workpiece;

collating the extracted characteristic portion and each of the registered template profiles;

reading out the template machining data associated with one of the plurality of template profiles recognized based upon the collating, to be corresponding to the extracted characteristic portion; and automatically preparing a machining program by assigning the read out template machining data to the extracted characteristic portion.

2. An automatic programming method to be used for preparing a machining program for a punch press, the method comprising:

registering a plurality of template profiles and at least one template machining data in association with each of the plurality of template profiles, each of the template profiles representing a characteristic portion of a graphic image to be used for machining, each of the at least one template machining data including a machining method that achieves the associated template profile;

extracting a characteristic portion of a graphic image for a machining operation of a workpiece;

collating the extracted characteristic portion and each of the registered template profiles;

reading out the at least one template machining data associated with one of the plurality of template profiles recognized based upon the collating, to be corresponding to the extracted characteristic portion; and automatically preparing a machining program by assigning one of the read out at least one template machining data having a highest priority to the extracted characteristic portion.

3. An automatic programming method to be used for preparing a machining program for a punch press according to claim 2, wherein the highest priority is given to a most recently registered template machining data.

4. An automatic programming method to be used for preparing a machining program for a punch press according to claim 2, wherein higher priority is given to more frequently used template machining data.

5. An automatic programming apparatus used for preparing a machining program for a punch press, comprising:

a machining rule memory that registers a plurality of template profiles and at least one template machining data in association with each of the plurality of template profiles, each of the template profiles representing a characteristic portion of a graphic image to be used for machining, each of the at least one template machining data including a machining method that achieves the associated template profile;

a characteristic extracting section that extracts a characteristic portion of a graphic image for a machining operation of a workpiece;

a collating section that collates the extracted characteristic portion and each of the registered template profiles;

a machining design data reader that reads the at least one template machining data associated with one of the plurality of template profiles recognized based upon the collating, to be corresponding to the extracted characteristic portion; and a machining program preparing section that automatically prepares a machining program by assigning one of the read at least one template machining data having a highest priority to the extracted characteristic portion.

6. An automatic programming apparatus to be used for preparing a machining program for punch press according to claim 5, wherein the machining program preparing section gives the highest priority to a most recently registered template machining data.

7. An automatic programming apparatus to be used for preparing a machining program for punch press according to claim 5, wherein the machining program preparing section gives higher priority to more frequently used template machining data.

* * * * *

UNITED STATES PATENT AND TRADEMARK OFFICE
CERTIFICATE OF CORRECTION

PATENT NO. : 6,247,006 B1
DATED : June 12, 2001
INVENTOR(S) : K. Tanabe et al.

Page 1 of 1

It is certified that error appears in the above-identified patent and that said Letters Patent is hereby corrected as shown below:

<u>Title page,</u>
Item [56], References Cited, the following U.S. PATENT DOCUMENT was omitted and should be included:
-- 5,864,482    1/1999    Hazama et al.    700/95 --

Signed and Sealed this

Twenty-fifth Day of December, 2001

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO. : 6,247,006 B1 Page 1 of 1
DATED : June 12, 2001
INVENTOR(S) : K. Tanabe et al.

It is certified that error appears in the above-identified patent and that said Letters Patent is hereby corrected as shown below:

<u>Title page,</u>
Item [73], Assignee, "Amada Metrecs Co., Ltd." should be -- Amada Co., Ltd. --

Signed and Sealed this

Fourteenth Day of May, 2002

*Attest:*

*Attesting Officer*

JAMES E. ROGAN
*Director of the United States Patent and Trademark Office*